United States Patent

[11] 3,551,586

[72] Inventors Matthew R. Dembiak
Clifton, N.J.;
George H. Webster, Timonium, Md.
[21] Appl. No. 809,547
[22] Filed Mar. 24, 1969
[45] Patented Dec. 29, 1970
[73] Assignees Said Dembiak Assignor to Western Electric Company, Incorporated
New York, N.Y.
a corporation of New York;
Said Webster Assignor to Bell Telephone Laboratories, Incorporated
Murray Hill, Berkeley Heights, N.J., a corporation of New York

[54] SHIELDED ELECTRICAL CABLE
13 Claims, 5 Drawing Figs.
[52] U.S. Cl..................................................... 174/107,
117/8; 156/344; 174/10, 174/112
[51] Int. Cl...................................................... H01b 7/18
[50] Field of Search............................................ 174/10,
107, 112; 156/247, 289, 344; 117/8

[56] References Cited
UNITED STATES PATENTS
3,173,991 3/1965 Breakfield, Sr............... 174/110X
3,499,218 3/1970 Dahlgren et al. ............. 174/110X

*Primary Examiner*—T. J. Kozma
*Assistant Examiner*—A. T. Grimley
*Attorneys*—H. J. Winegar, R. J. Miller and R. C. Camp ABSTRACT: A metallic tape having a release agent material applied selectively in at least one longitudinal strip on one major surface thereof is then coated over the strip and both major surfaces with an adhesive material. The tape is wrapped longitudinally about a cable core, with the one major surface facing the core, to form an overlapped seam which is then heated to bond the adhesive on the one major surface to the adhesive on the other major surface. The strip of release agent material may be easily removed together with the overlying adhesive to bare the metal to facilitate grounding at a splice location.

INVENTORS
M. R. DEMBIAK
G. H. WEBSTER

E. W. Somers
BY ATTORNEY

SHIELDED ELECTRICAL CABLE

BACKGROUND OF THE INVENTION

1. Field of the Invention

This invention relates to a shielded electrical cable, and more particularly, to an electrical cable having a sealed metallic barrier including a strip of a release material which may be easily removed from the barrier to bare the metal and facilitate grounding at splice locations.

2. Technical Considerations and the Prior Art

In the cable industry, it is well known that changes in the ambient conditions lead to differences in vapor pressure between the inside and the outside of a plastic cable sheath which generally operates to diffuse moisture in a unidirectional manner from the outside of the cable to the inside of the cable. This eventually will lead to an undesirably high moisture level inside the cable, especially if a polyethylene jacket is the only barrier to the ingress of the moisture and, high moisture levels inside a cable sheath will have a detrimental effect on the transmission characteristics of the cable.

Polyethylene which is used in the jacketing of cable, prevents the passage of water only on a microscopic scale. Where cables are in use the periods of 20 to 40 years and where the conductors within the cables are sensitive to the presence of moisture, it becomes necessary to consider methods of preventing the ingress of moisture into the cable not only on a microscopic but also on a molecular level.

A metallic barrier which is wrapped around a cable core is an effective barrier against diffusion of moisture into the cable core. Telephone cable of this construction is referred to in the art as "Alpeth" cable and is described more fully in the F. W. Horn and R. B. Ramsey paper "Bell System Cable Sheath Problems and Designs" in A.I.E.E. Proceedings 1951, Volume 70. The metallic barrier, including a metallic shielding strip or tape, for example aluminum, may be corrugated transversely prior to being wrapped about the cable core in order to give greater flexibility to the cable and to permit bending of the completed cable without wrinkling or rupture of the shielding strip.

Since most communications require an electrically conductive metallic shield to protect against external electrical signals, it is usually desirable to incorporate the shielding function with the moisture barrier function in one layer of metal. Good electrical continuity is a requisite of an acceptable shielding material.

Underground cables are generally exposed to ground water penetration, and thus, to more severe corrosive conditions. The corrosion problem in buried telephone cables is serious enough to suggest the consideration of replacing of aluminum shielding tape with more expensive metals. However, tests have shown that even copper tape will not extend the useful life of underground cables enough to provide the optimum life span which is dictated by the economics of telephone installation. Other solutions, such as the use of tapes of noble metals and flooding of the cable with protective compounds have been heretofore proposed, but have not been widely, if at all, accepted.

If the barrier is made from a single strip of metal, such as aluminum, in the form of a tape, which is wrapped longitudinally about the cable to overlap the edge portions, the effectiveness of the strip as a moisture barrier or shield is enhanced substantially if the seam between the overlapping edges is sealed. More particularly, a seal is most effective in which a metal-to-metal bond of the overlapping edge portions is accomplished, for example, by welding or soldering. Generally though, the materials which are used as a shield are temperature sensitive and easily damaged if overheated. These characteristics render the use of welding, as a sealing technique, impractical because of the high temperature involved in most ordinary welding processes. Moreover, the aluminum, because of its highly reactive nature, generally maintains an oxide film which virtually precludes continuous soldering as a joining technique in situations such as manufacturing of a cable sheath. Therefore, other methods have been devised for sealing the overlapping edges of the seam of the aluminum, longitudinally wrapped, shield.

After the metallic strip of say aluminum, is folded about the cable core to form a tube, an outer jacket of polyethylene is extruded over the tube. As the polyethylene cools, the polyethylene material contracts. The cooling proceeds from the outer surface of the jacket inwardly with the shrinkage forcing the polyethylene into close engagement with the surface of the longitudinally folded strip and slides the overlapping edge portions of the metallic strip relative to each other to partially collapse the shield. The relative sliding movement of the overlapping edge portions is stopped when the tubular shield is supported against the cable core. During this shrinkage, the outer overlapping edge of the folded strip presses outwardly into the plastic jacket thereupon reducing the effective jacket thickness radially outward from the strip edge.

In order to improve the corrosion resistance of the barrier and eliminate the slippage along the seam, an adhesive copolymer such as an ethylene acid copolymer and more particularly ethylene copolymers containing acrylic acid as well as the partially neutralized forms of these thermoplastic adhesive copolymers may be applied to both sides of the metallic strip to form a shielding layer. The adhesive copolymer which is applied as a film has high electrical resistivity, high resistance to chemicals and moisture, and good adhesion to the aluminum to withstand manufacturing processes, such as corrugating and longitudinal folding, and to prevent delaminations in corrosive environments. The application of adhesive copolymers in laminates is discussed by B. Wargotz in an article "Environmental Stability of Ethylene-Acrylic Acid Adhesive Copolymers Bonded to Metal Substrates" published in Vol. 12 of the Journal of Applied Polymer Science, pages 1873—1888 (1968). Adhesive copolymers also develop a firm bond between the metallic strip and the outer polethylene jacket. Usually, a metallic, for example aluminum, tape is precoated on both sides with the adhesive copolymer, across the entire width thereof, after which the precoated tape is folded longitudinally about the cable core.

When a polyethylene jacket is extruded over the metallic barrier, the heat from the semimolten polyethylene bonds the metal strip to the jacket. If the heat imparted to the polyethylene is sufficiently high, the aluminum tape will become hot enough so that the overlapped portions of the barrier bond together at the seam. The coated metallic strip firmly adheres to the outer jacket to further inhibit the penetration of moisture. The use of a shielding layer with a sealed seam also has been shown to have higher strength characteristics necessary to withstand repetitious bending of the cable.

Although the desired bond between the outer jacket and the core and the prevention of moisture penetration is solved by the use of a coated metallic strip, problems arise in terminating and splicing the cables. In a splice case, for example, it is required that an inner sheath clamp be placed over the core and in contact with the inner surface of the metallic strip. An ear is formed at each end of the sheath clamp which protrudes through slots cut in the metallic strip and are exposed for engagement with a grounding clamp. Because of the intimate bond between the metallic strip and the copolymer coating, it is difficult to bare the metallic strip to make electrical contact with the inner sheath clamp.

Of course, the cable could be manufactured with something less than an intimate bond between the jacket and the shield to facilitate splicing and grounding while still providing corrosion protection for the metal-shielding strip. However, any reduction in adhesive at the interface will be matched by a corresponding reduction in the absolute resistance to moisture penetration.

In at least one prior art patent, this general problem is recognized. Accordingly, in that disclosure, firm adhesion of the adhesive copolymer is restricted to only a portion of the interface between the jacket and the shielding layer. More specifically, the metallic strip is coated with the reactive carboxyl group material only along the longitudinal edge portions and for a limited predetermined distance on each side of the strip from the edges. The remainder of the strip is coated with a material having less adhesive qualities or may be coated with the same material over the entire width and then treated along a portion thereof intermediate the edges to reduce the adhesive characteristics of the coating in the portion intermediate the edges, (See U.S. Pat. No. 3,379,821 issued Apr. 23, 1968.)

However, in the cable construction just described, protection against moisture penetration depends upon a sealed seam. The absence of an intimate bond between the jacket and the shielding layer around the majority of the periphery of the cable presents the possibility of moisture penetration through pin holes with subsequent travel of the moisture along the length of the cable between the jacket and the shielding layer. In many splicing operations, it is unnecessary to strip the outer jacket from the metallic-shielding layer; and hence, the construction of the cable with reduced adhesive around a major portion of the periphery unnecessarily increases the chance of moisture penetration. Moreover, even if it were necessary to strip the outer jacket from the metallic-shielding layer in the splice location, it would seen incongruous to reduce the adhesion of the jacket to the shielding layer along the entire length of cable to expedite the stripping function for a short distance along the cable at the splices.

The term "facing" as employed in the specification and claims appended thereto when referring to the relationship between a surface and an object will be understood to mean that the surface is oriented in the direction of the object and may be, but is not necessarily, adjacent to or in contact with the object.

The term "major surface" as employed in the specification and appended claims when referring to surfaces of a strip of material should be understood to include the large faces of the strip and not the edges of the strip even though the faces might have curved, corrugated or otherwise nonplanar configurations and even though the edges might blend smoothly into the faces without any sharp geometrical definition.

The term "polymeric" material as employed in the specification and appended claims will be understood to include both thermoplastic compounds such as polyethylene and polyvinyl chloride or the like, thermosetting compounds such as expoxies and polyurethanes and elastomers such as neoprenes.

It is an object of this invention to provide a cable having an outer jacket firmly bonded to a metallic-shielding barrier with a sealed longitudinal seam in which a major surface of the metallic barrier may be bared to facilitate splicing and grounding operations.

Of course, it is possible to merely coat one major surface of the aluminum strip with the adhesive copolymer but then there would be no adhesive on the other major surface to obtain the desired bond with the adhesive on the one major surface along the overlapped edge portion at the seam. The copolymer on the outer major surface of the aluminum strip will not adhere to the inwardly facing major surface of the aluminum during the normal type extrusion operation so as to obtain the desired seal. In order to obtain a sealed seam, the other major surface of the aluminum strip must e be precoated at least along the edge portion thereof with an adhesive, under controlled conditions, during which the aluminum is preheated. Methods have been developed which now permit the selective application of adhesive to only a portion of the other, for example, inwardly facing major surface of the metallic strip. This procedure is disclosed in copending application, Ser. No. 809,589, filed Mar. 24, 1969 by the same inventors.

It is an object of this invention to provide a cable in which both of the major surfaces of a metallic strip are coated across the entire transverse width thereof with an adhesive material to form a metallic-shielding barrier with the provisions for stripping the adhesive material from one of the major surfaces of the strip at predetermined locations.

With these and other objects in mind, the present invention contemplates a shielded electrical cable having a core in which a metallic barrier is wrapped longitudinally about the core with the barrier including a metallic tape coated on major surfaces with an adhesive and having longitudinal bands of an identifiable and strippable material interposed between the metallic tape and the adhesive on one of the major surfaces to facilitate removal of the adhesive from the one major surface.

More particularly, a cable illustrating certain features of the invention, may include a core and a sealed metallic barrier having opposed major surfaces and surrounding the core. The inwardly facing major surface faces the core and the metallic barrier has at least one overlapped seam and an adhesive copolymer bonded to the inwardly and outwardly facing major surfaces of a metallic tape, and maintaining a definite form at ambient temperature. The adhesive copolymer material develops a bond with the metallic tape at a predetermined temperature above ambient temperature. At least one strip of a release material is interposed between the inwardly facing major surface of the metallic tape and the adhesive copolymer to facilitate removal of the adhesive copolymer from the metallic tape. The release strips with copolymer superimposed thereon at easily located predetermined spacings are identifiable and readily pulled out of engagement with the metallic tape to pull the copolymer away from the metallic tape and bare the tape for splicing and grounding.

Additional advantages and features of the invention will be better comprehended by reference to the drawing and the detailed descriptions which follows.

DETAILED DESCRIPTION

Figure 1:
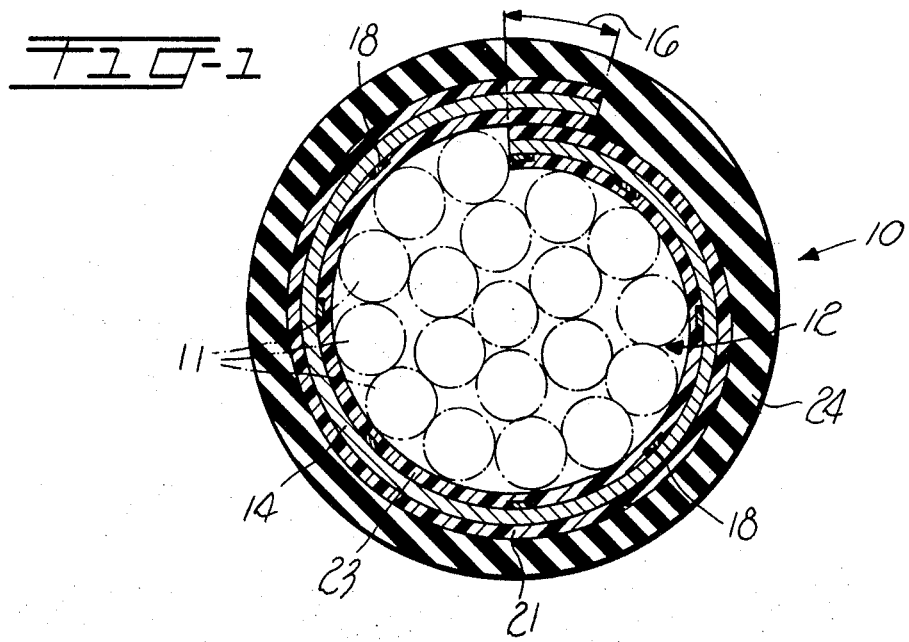
FIG. 1 is a sectional view of a cable which includes the principles of the present invention and showing a cable core with a metallic barrier wrapped longitudinally about the core and having a jacket extruded thereover.

Referring now to FIG. 1, there is shown a portion of a cable, designated generally by the numeral 10, and having a plurality of insulated conductors 11 which comprise a core, designated generally by the numeral 12. The core 12 which is coextensive with the cable 10 and which is enclosed by a core wrap (not shown) comprised of a paper tape or a rubber-polyethylene terephthalate laminate must be protected against moisture and corrosion.

Accordingly, to protect the core 12, a shielding layer or barrier, designated generally by the numeral 13 (see FIG. 2), is formed and is then wrapped longitudinally around the cable 10 to enclose the core. The barrier 13 includes a metal shield 14, for example, aluminum, which may be corrugated and which is in the form of a tape.

The shielding layer or barrier 13 functions to help prevent the diffusion of water vapor into the core 12 of the cable 10. In addition to serving the diffusion prevention function, the metallic strip or tape 14 of the barrier 13, operates effectively to absorb the energy from stray electromagnetic fields emanating from sources outside the communications cable 10.

Because the metallic tape 14 serves a dual function, the tape is preferably made from an electrically continuous, electrical conductor grade aluminum alloy approximately 0.008 inch thick. The particular metal and thickness of the metallic tape is not important to this invention; the metal could be copper or brass or any of a number of other conductive materials if dictated by other considerations.

When the metallic tape 14 is wrapped longitudinally about the core 12 with edge portions of the major surfaces of the strip overlapped with each other to form a seam 16, it is necessary to seal the seam to prevent moisture from penetrating into the core and to avoid other problems discussed hereinbefore. In order to seal the longitudinal seam formed by the overlapping edge portions of the metallic tape 14 and simultaneously make provisions for baring an inwardly facing major surface 17 of the metallic tape 14 which faces the core 12 at splicing locations, the tape is selectively precoated with different materials.

Figure 2:
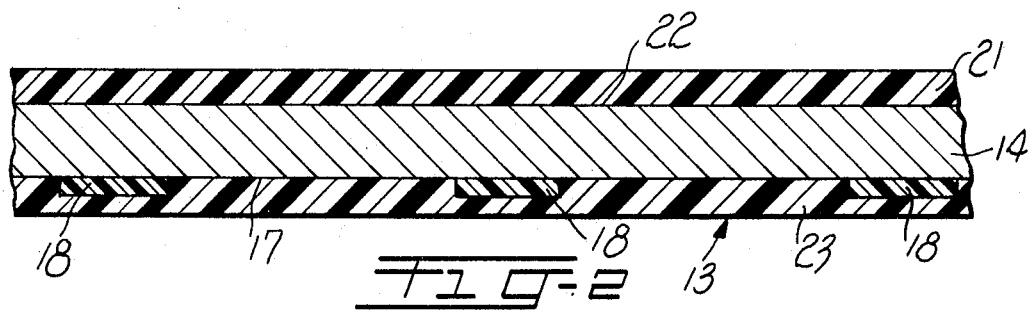
FIG. 2 is a detail view of a developed portion in section of the metallic barrier with a plurality of spaced strips of a release agent material coated over the inwardly facing major surface of a metallic tape and having an ethylene acid copolymer coated over the outwardly facing major surface and over the inwardly facing major surface and strips of release material.

Initially, a polymeric release agent material is coated by conventional techniques or extruded onto the inwardly facing major surface 17 of the aluminum tape 14 which, when wrapped about the advancing core, faces the core (see FIG. 2). The release agent material may be any commercially available material such as vinyl chloride resins which does not inherently adhere to the aluminum tape 14, but is characterized in that the release agent material may be applied in stripes from a solution. Although the release agent material is polymeric, the release agent material has a degree of adherence to the aluminum tape 14 which is substantially less than an ethylene acrylic acid copolymer, and is readily peelable from the aluminum tape.

Figure 3:
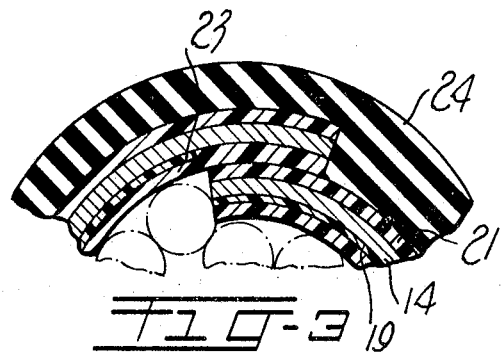
FIG. 3 is a portion of an end view in section of a cable showing another embodiment of the present invention with the release agent coated over a majority of the inwardly facing major surface of the tape.

The release agent material may be placed on the inwardly facing major surface 17 of the tape 14 in any of several configurations. For example, a plurality of stripes or strips 18 spaced transversely across the metallic tape 14, as shown in FIG. 2, may be coated or extruded longitudinally along the inwardly facing major surface 17 of the tape 14. Or alternatively, as shown in FIG. 3, a layer 19 of the peelable material may be coated over the aluminum tape 14 except for a narrow longitudinal edge portion on the inwardly facing major surface 17 of the tape.

Then, in order to seal the longitudinal seam 16 along the overlapped portions of the major surfaces of the aluminum tape 14, an ethylene acid copolymer such as an ethylene acrylic acid copolymer is applied to form a layer 21 on an outwardly facing major surface 22 of the tape 14 (see FIG. 2). This adhesive copolymer which is a heat sensitive material, is available from the Dow Chemical Company of Midland, Mich. under description Copolymer Resin QX2375.0. Simultaneously, or subsequently, a layer 23 of the same adhesive copolymer as that which comprises layer 21, is coated over the peelable strips 18 of the release agent material and over the remaining bared portions of the surface 17 of the aluminum tape 14, as shown in FIG. 2.

In order for an installer to be able to quickly identify the strips of release agent material, the release material should be visually distinguishable from the adhesive copolymer. The peelable strips 18 are constructed of a material having a distinct color and the overlying coating layer 23 is of sufficient transparency to render the underlying strip discernible.

Then the moisture barrier 13 which includes the metallic tape 14 sandwiched between adhesive copolymer layers 21 and 23 with peelable strips 18 of a release material interposed between the adhesive copolymer layer 23 and the inwardly facing major surface 17 of the strip 14 is assembled to the core 12. The peripheral edge portion of the adhesive copolymer layer 21 on the outwardly facing major surface 22 is placed in engagement with the peripheral edge portion of the adhesive copolymer layer 23 on the inwardly facing major surface of the strip to form the overlapping seam 16 (see FIG. 1). The heat sensitive copolymer material has the ability to develop a mechanical and a chemical bond to the aluminum tape 14 and also bonds to the peelable strips 18 and to an overlying jacket 24 (see FIG. 1) comprised of polyethylene or other suitable plastic-insulating material.

The physical size of the sealed overlap seam 16 is an important factor in the ability of the moisture barrier 13 to prevent diffusion of water into the cable 10. The rate at which water vapor diffuses through a material is proportional to the area which is exposed to the source of water vapor and the rate of diffusion is inversely proportional to the length of the path through which the water vapor must travel. It should be apparent that as an overlapped seam 16 of the moisture barrier 13 is decreased in width and as the thickness of the adhesive seal in the seam portion increases, the ability of the adhesive seal to prevent moisture diffusion is increased. As a practical matter, however, it becomes necessary to assign definite dimensions to the overlapped seam 16. Cost and manufacturing considerations are factors which, together with moisture diffusion, have led to a determination of optimum dimensions for the overlapped seam 16.

The resistance of the cable 10 against the penetration of moisture is further improved by applying the polyethylene jacket 24 to the outwardly facing major surface of the adhesive copolymer layer 21 under extruding temperatures which are designed to yield optimum bonding of the polyethylene to the barrier 13.

Figure 4:
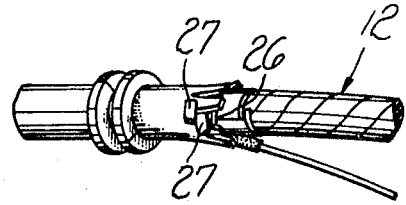
FIG. 4 is a view showing the cable at a splice location with a portion of the shielding layer and jacket cut away from the core to permit insertion of a grounding ring for grounding the cable.

The construction of the cable 10 in accordance with this invention facilitates the grounding of the cable at a splice location. For example, during installation and at a splicing location, the jacket 24 and moisture barrier 13 may be slit and pulled away from the core 12 as shown in FIG. 4. Then an installer visually identifies the colored strips 18 readily discernible from the overlying transparent layer 23, and applies sufficient pulling forces to the strips to peel the strips from the metallic tape 14. The bonded laminate formed on the strips 18 and overlying portions of the adhesive copolymer layer 23 are of sufficient strength so that when the strips are peeled away from the metallic tape 14, the overlying portions of the layers 23 are torn away from the portions of the adhesive copolymer adjacent the strips. In this way, a grounding ring 26 having ears 27 may be inserted under and in electrical engagement with the bared portions of the metallic tape 14 (see FIG. 4).

METHOD OF MANUFACTURE

In a method of manufacturing a cable which embodies the principles of the present invention, the metallic strip 14 in the form of a tape is precoated with at least one longitudinal strip 18 of a release material on the inwardly facing major surface 17 thereof (see FIG. 2). Then the inwardly and outwardly facing major surfaces 17 and 22, respectively, of the metallic tape 14 are coated with the adhesive copolymer films 23 and 21, respectively, across the entire transverse width of the metallic tape (see FIG. 2). Generally, the metallic tape 14 precoated with adhesive copolymer layer 21 is a commercially purchased item and is available, for example, from Dow Chemical Company under the designation, Zetabond 280.

Figure 5:
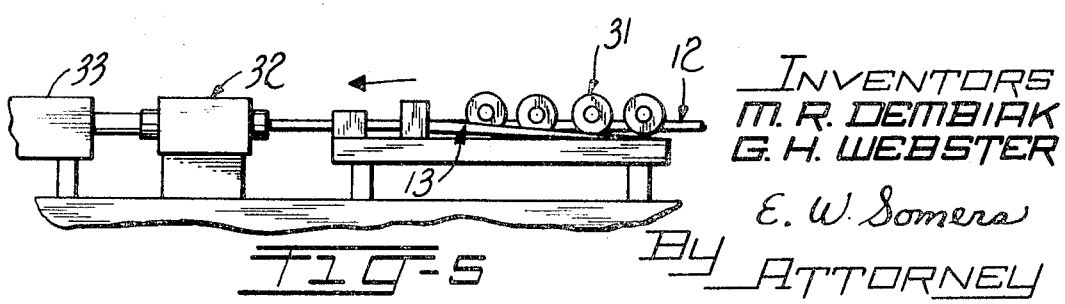
FIG. 5 is a simplified elevational view showing an apparatus used to manufacture a cable which embodies the principles of this invention to advance a metallic tape and then to wrap the tape around the advancing core and extrude a jacket thereover.

Referring now to FIG. 5, the barrier 13 including the precoated metallic tape 14 is folded longitudinally about the advancing core 12 by a tube-forming device, designated generally by the numeral 31, to enclose the core and to form the overlapping seam 16 between the inwardly facing major surface of the tape and the outwardly facing major surface thereof. Then the enclosed core 12 is advanced to, and through, a conventional plastic extruder, designated generally by the numeral 32, which is used to extrude the circumferential jacket 24 of polyethylene over the shielding layer 13. Molten polyethylene may be fed from the extruder 32 at a temperature of from 375° F. to 475° F. It is more desirable to restrict the temperature range to one of 25° F. between 425° F. and 450° F.

As the core 12 and barrier 13 are advanced through the extruder 32, the overlapped seam 16 is sealed. There is sufficient heat within the polyethylene so that the heat transfer takes place into the adhesive copolymer layers 21 and 23 and into the metallic tape 14. As a result of the heat transfer from the polyethylene jacket 24 into the adhesive copolymer layers 21 and 23, the temperature of the adhesive copolymer is raised sufficiently to bond the overlying copolymer coatings of the overlapped portions of the major surfaces at the overlapping seam 16 together and to simultaneously bond the copolymer layer 21 to the jacket 24.

After a polyethylene jacket 24 has been extruded onto the core 12 and the moisture barrier 13, provisions must be made to prevent an excessive amount of heat flowing from the hot plastic-jacketing material inwardly toward the core. This sometimes damaging heat flow is impeded by rapidly chilling the plastic jacket 24, with any of several apparatuses 33 well known in the art.

Alternately, the overlapped bonded seam 16 may be formed independently of the jacket extrusion. Successive portions of the metallic tape 14, precoated with the adhesive copolymer may be drawn into an induction-heating unit similar to those units disclosed in U.S. Pat. Nos. 2,758,189, 2,801,316 and 2,925,485 which issued on Aug. 7, 1956, July 30, 1957 and Feb. 16, 1960, respectively, to D. A. Hughes.

A section of the subassembled cable 10 which has been covered by the precoated metallic tape 14 is advanced through the induction-heating unit (not shown) in which high frequency magnetic fields develop currents within the overlapped seam portion 16 of the metallic barrier 13, to heat the seam portion. By properly controlling the power to the induction-heating unit with conventional control equipment (not shown), sufficient heating may be provided to bond the seam 16 without degradation of the copolymer layers 21 and 23 and without damage to the core 12. A water-quenching station (not shown) is located immediately adjacent the exit end of the induction-heating unit (not shown) to spray water at ambient temperature onto the seam 16 to cool the seam 16 while maintaining pressure thereon.

After the metallic barrier 13 is bonded into a tubular shape on the core 12, the subassembled cable 10 may be wound on a reel (not shown). Then the subassembled cable 10, including the core 12 and tubular metallic barrier 13, may be advanced into the extruder 32, and the polyethylene jacket 24 applied to the outside of the metal covered core unit.

One of the advantages in using a metallic barrier application technique which consists of a two step operation of heating, and later jacketing, is that the integrity of the sealed overlapped seam 16 can be checked before the polyethylene jacket 24 is applied. Various techniques can be used to check the integrity of the seal. One such technique is described in U.S. Pat. No. 2,988,917, issued on June 20, 1961 to C. A. Hallam et al. If defects are found in the sealed overlapped seam 16, the continuous forming and sealing operation can be stopped long enough to allow a repair to be made to the defective portion of the seam. Conventional control systems (not shown) are readily available that monitor the amount of heat to be applied to the seam 16 through the induction-heating unit (not shown) as the core 12 is started and stopped when repairs are required.

The use of a forming, sealing, and seam integrity checking system, independently of a jacket extrusion operation, permits the interruption of the manufacturing of the cable 10 to make repairs. The impairment of the efficiency of an extrusion operation which would ordinarily result from a starting or stopping of the cable to make repairs is thereby avoided.

If circumstances were to make it unimportant to be able to start and stop the forming and sealing operation, the application of the jacket 24 could be accomplished in a tandem operation which the forming and sealing without the intermediate step of taking up the core 12 surrounded by the metallic barrier 13. A conventional device (not shown) for checking the integrity of the overlapped seam 16 could be used to mark faulty areas so that the faulty areas could be repaired or cut out of the cable 10 after the jacket 24 had been applied.

The cable 10 may also be assembled employing the principles of the method of this invention to provide for grounding the outwardly facing major surface 22 of the metallic tape 13. Accordingly, the strips 18 of release agent material are applied to the outwardly facing major surface 22 and then layers 21 and 23 of an ethylene acrylic acid copolymer are coated over the inwardly facing major surface 17 and over the strips 18 and outwardly facing major surface 22.

It is to be understood that the above-described embodiments are simply illustrative of the invention and that many other embodiments can be devised without departing from the scope and spirit of the invention.

We claim:

1. A cable having a core surrounded by a shield which is folded about the core with an overlapping seam, said shield having coatings adhered to the major surfaces thereof and adhered together along said seam, the improvement which comprises: at least one strip of material embedded in the coating on one of the major surfaces of the shield and in engaging relationship with the one major surface of the shield, said strip constructed of a material that is peelable from the shield.

2. A cable as defined in claim 1, wherein the strip is of a distinct color and the overlying coating is of sufficient transparency to render the underlying strip discernable.

3. A cable having a core surrounded by a metallic shield which is folded about the core with an overlapping longitudinal seam, said shield having plastic coatings adhered to the outwardly and inwardly facing surfaces and adhered together along said longitudinal seam, the improvement which comprises:

a plurality of strips of material embedded in and bonded to the plastic coating and positioned longitudinally in spaced engaging relationship with the inwardly facing major surface of the shield, said strips being constructed of a material that is readily peelable from the metallic shield.

4. A cable as defined in claim 3, wherein the adherent plastic coating is constructed of material that is light transparent, and the strips are constructed of material that is discernible from that of the plastic coating.

5. A cable as defined in claim 3, wherein the strips are bonded to the overlying coating with sufficient strength to tear the strips and overlying coating from the coating on the inwardly facing major surface adjacent the strips upon application of forces to peel the strips from the metallic shield.

6. In a cable:
a core; and
a laminated shield surrounding the core and having at least one overlapped seam said laminated shield having inwardly and outwardly facing major surfaces, the inwardly facing major surface facing the core, and comprising:
a metallic strip;
an adhesive copolymer material applied to the major surfaces of the metallic strip for bonding overlapping surfaces along said seam; and
at least one strip of release agent material applied longitudinally along the inwardly facing major surface of said metallic strip and interposed between said metallic strip and said adhesive copolymer material.

7. A cable which comprises:
a core;
a metallic shield surrounding the core and having inwardly and outwardly facing major surfaces, the inwardly facing major surface facing the core, and the metallic shield having at least one overlapped seam;
an extruded jacket of plastic insulating material surrounding the metallic shield;
an adhesive copolymer material applied to the major surfaces of the metallic shield for bonding the jacket to the outwardly facing major surface of the metallic shield and for bonding the overlapping surfaces along the seam; and at least one strip of a release agent material coated longitudinally along said inwardly facing major surface of said metallic shield between said metallic shield and said adhesive copolymer material to facilitate removal of the adhesive copolymer from the inwardly facing major surface of the metallic shield upon application of forces to peel the strip from the metallic shield.

8. A cable as set forth in claim 7, wherein:

said adhesive copolymer material is comprised of an ethylene acid copolymer; and said release agent material is comprised of a vinyl chloride resin which is visually distinguishable from said ethylene acid copolymer.

9. A cable as set forth in claim 8, wherein:

the metallic shield is formed from an indefinite length of substantially flat aluminum.

10. A cable as set forth in claim 7, wherein:

said adhesive material is an ethylene acid copolymer.

11. A cable as set forth in claim 10, wherein:

said ethylene acid copolymer is an ethylene acrylic acid copolymer.

12. A cable as set forth in claim 10, wherein:

said release material is characterized as having an adherence to said metallic shield substantially less than the adherence of said ethylene acid copolymer to said metallic shield.

13. A cable as set forth in claim 12, wherein:

said release material is a vinyl chloride resin which is visually identifiable from said ethylene acid copolymer.